Jan. 7, 1947.  E. H. JULIANO  2,413,976

MACHINE FOR CONTINUOUS DRY POWDERING OR CURING SEEDS AND GRAIN

Filed Nov. 18, 1943  2 Sheets-Sheet 1

Inventor
Egidio H. Juliano

By

Attorney

Jan. 7, 1947.   E. H. JULIANO   2,413,976
MACHINE FOR CONTINUOUS DRY POWDERING OR CURING SEEDS AND GRAIN
Filed Nov. 18, 1943   2 Sheets-Sheet 2
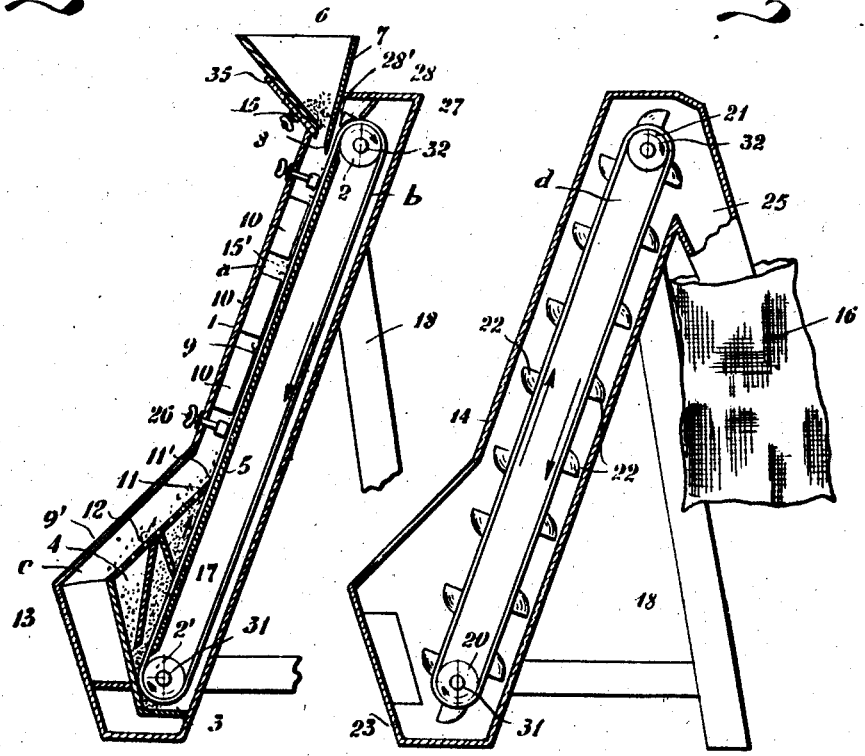
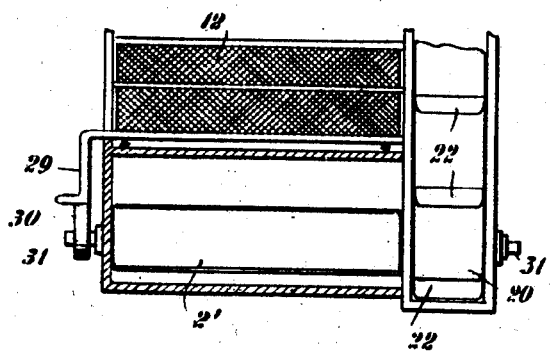
Inventor
Egidio H. Juliano
Attorney Patented Jan. 7, 1947

2,413,976

UNITED STATES PATENT OFFICE 2,413,976

MACHINE FOR CONTINUOUS DRY POWDER-
ING OR CURING SEEDS AND GRAIN

Egidio Hipolito Juliano, Necochea, Argentina

Application November 18, 1943, Serial No. 510,824
In Argentina July 16, 1943

4 Claims. (Cl. 83—28)

This invention relates to machines for continuously curing seeds and grain, and particularly to a machine for dry-curing or powdering seeds and grain.

Different types of machines have been known and used heretofore for curing cereals, but in general they are based on the mixing system which is slow since it involves the use of drums and trays with intermittent charging, thus rendering the operation rather complicated.

The ideal would no doubt be a machine with a simple mechanism, capable of enabling a constant charge and discharge without requiring accumulating boxes, and this is precisely what is achieved by means of the present invention, which covers a simple assembly wherein the only movable element which is considered essential is an endless belt located in a somewhat inclined plane and receiving the powder by contact from a container, so as to place same in contact with the grain which is caused to slide down in counter-current. The assembly also comprises deflecting means so that the treated grain will be directed straight to a discharge where it may be received in sacks or otherwise disposed of.

For this purpose, the machine comprises an oblique passage, the bottom of which is constituted by said endless belt, which is related with the curing powder container, and apart from comprising courses in zigzag or deflecting elements so as to provide a longer path for the grain introduced through a hopper, said passage includes a final deflecting member by means of which the grain is deflected from the treating zone so that, after passing through a screen where it will lose the excess powder adhered thereto, said grain will follow a sloping path or be elevated by an endless conveyor to a discharge for bagging or other purposes.

Apart from the above, the invention contemplates other objects, amongst which may be mentioned the possibility of obtaining a large working capacity with a small and simple assembly which may be readily coupled directly to a seed cleaning machine.

A further object of the invention is to provide a quick treating service which will treat the grain in a manner so as to place same directly in sacks, without the necessity of stationing and also without any danger to the operator, since both the curing or treating chamber and the conveyor are perfectly shielded up to the discharge mouth to which the sack is applied.

A further object of the invention is to provide means enabling the free operation without the necessity of dosing the treating powder, as any excess powder will be removed by the above-mentioned screen.

Other objects and advantages of the invention will become apparent from the course of the following description when read in conjunction with the accompanying drawings illustrating the invention by way of example and in a preferred embodiment.

In the drawings:

Fig. 3 is a sectional side view of the machine, taken along the line X—X of Fig. 1;

Fig. 4 is a further sectional side view of the machine, taken along the line Y—Y of Fig. 1; and Fig. 5 is a sectional plan view of the same machine, taken along the line V—V of Fig. 1.

The same reference characters are used to indicate like or corresponding parts or elements throughout the drawings.

Figure 1:
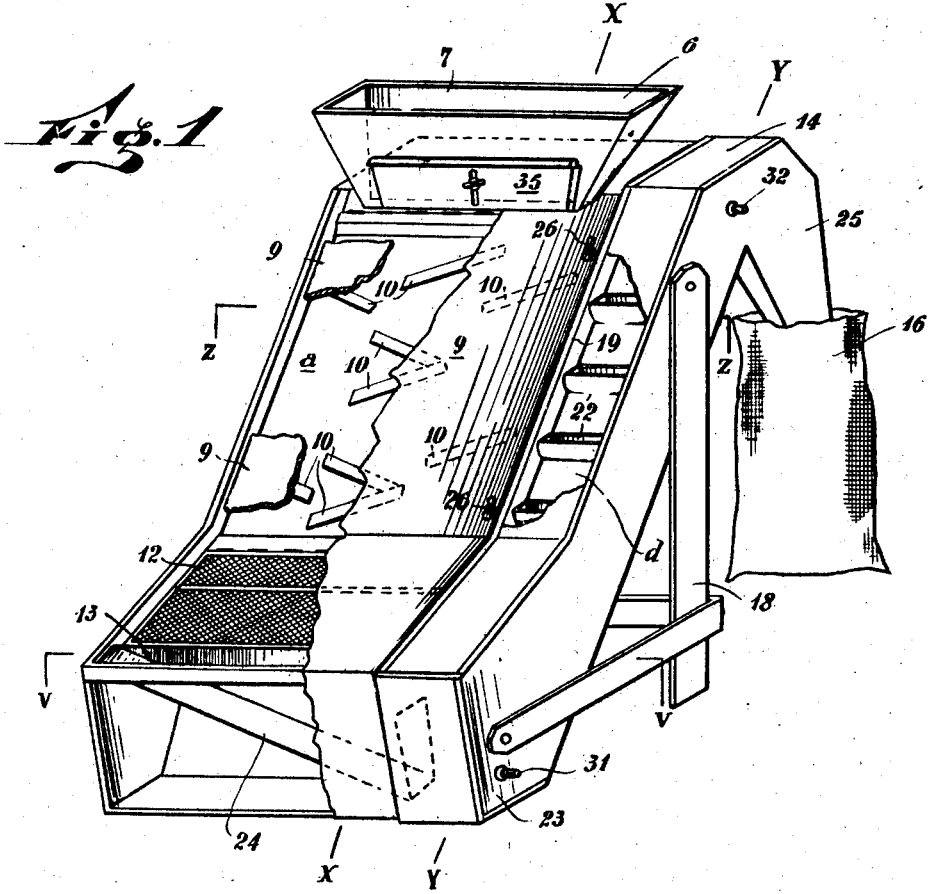
Fig. 1 is a perspective view of the machine partially in section so as to show the treating chamber or passage.
Figure 2:
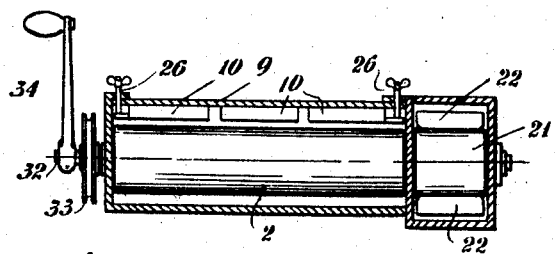
Fig. 2 is a sectional view of the same machine, taken along the line Z—Z of Fig. 1.

Referring now to Fig. 1, it may be seen that the new machine for curing grains, seeds and cereals in general comprises a treating passage *a* substantially inclined, the bottom of which is constituted by the working portion 1 of an endless band *b* guided on two rollers 2 and 2'. The lower end of said endless belt *b* enters a container 3 containing a treating powder 4, the working portion 1 of said endless belt *b* bearing on a sliding bed 5 so as to avoid the fluctuation or vibration of said belt during the operation of the machine.

The upper portion of said treating passage *a* comprises a hopper 6 the rear wall 7 of which is located substantially in a plane parallel to the inclined plane of the working portion 1 of said endless belt *b*, the lower portion of said rear wall 7 being provided with a scraping blade 8 the sharp edge of which engages the surface of said belt *b*.

As shown in Fig. 3, the cover 9 of said treating passage *a* comprises a plurality of deflecting partitions 10 fixed to said cover 9 and extending towards the surface of the endless belt *b* without contacting the latter.

Said treating passage *a* terminates with the deflecting plane 11, the edge 11' of which bears against the surface of the endless belt *b*, said deflecting plane or element being provided with a screen 12 and constituting, in combination with an extension 9' of said cover 9, a deflecting conduit c ending in a container 13 having a plane inclined towards a bagging chute or combined with an endless conveyor d.

One of said rollers 2 of the endless belt b is coupled to a power source and rotates in the direction shown by the arrow in Fig. 3, so that the working portion 1 of said belt b constituting the bottom or track of said treating passage a, will effect a continuous upward motion, carrying on the surface thereof a quantity of sterilizing powder 4, the excess of which will be removed by the scraper 17 located between the container 3 and the deflecting element 11 of the machine.

Simultaneously, the grains 15' of the cereal 15 contained in the feeding hopper 6 will fall by gravity into the treating passage a and will roll on the surface of the working portion 1 of said endless belt b, thereby becoming intimately mixed with the sterilizing powder adhered to said belt, and inasmuch as the deflecting partitions 10 fixed to the cover 9 of said passage will extend the downward course of the grains 15' of cereal 15 through said passage, upon reaching the surface of the deflecting element 11 of said chamber, said grain will become fully powdered, as required in this kind of treatment.

Upon the grains of cereal 15 passing through screen 12, any excess of powder 4 adhered thereto will fall through the orifices in said screen into the deposit 3, thereby recovering said powder 4 which is returned from said deposit 3 to the treating passage a, as explained hereinbefore, while the treated or cured grains follow by the deflecting or branch conduit c towards the container 13 which, as stated above, may have a direct discharge or may be elevated by means of a conveyor d.

It will therefore be seen that the charging of untreated cereal and the treatment thereof with sterilizing powder 4 in the treating passage a, as well as the discharge of the treated cereal from the container 13, is carried out in a continuous manner, without any interruptions in the operation of the machine, which will naturally result in high economic yield.

Also, the necessity of dosing the sterilizing powder 4 has been entirely eliminated in the improved machine of the present invention, since the surface of the working portion 1 of the endless belt b will always carry adhered thereto an amount of powder 4 sufficient to obtain a complete treatment of cereal 15, the excess powder adhered to the grains 15' of the cereal being removed during the passage thereof over the screen 12 of the machine.

As shown in Fig. 1, the seed treating machine forms a general box supported by frame 18 in inclined position.

Said box is provided with a complementary portion 14 having a partition 19 by means of which it is separated from the remainder of the box carrying the endless belt b and other main elements of the machine.

Located within said complementary portion 14 is an elevating conveyor d mounted between rollers 20 and 21, as clearly shown in Fig. 4, both rollers 20 and 21 are fixed to the shafts of rollers 2' and 2, respectively, of endless belt b, so that said conveyor will move in synchronism with said endless belt b.

Said roller 20 is located at the bottom of said complementary portion 14 and arranged so that the buckets 22 of said conveyor will collect the grains or seeds from the container 23, which is combined with container 13 from which it receives the grains by means of the inclined plane 24. Said conveyor d is provided with a discharge chute 25 to which the sacks 16 are applied for the purpose of collecting the treated grains.

The deflecting partitions are secured to the cover 9 by means of threaded supports 26 acting as screws and allowing the regulation of the position thereof within the treating passage a.

Certain grains might adhere to the endless belt b during its upward course, and to take care of this event, a further scraper blade 27 is provided following the scraping blade 8, and a return device 28 is located between said blades 8 and 27, said device 28 comprising a triangular prism allowing the passage of the grains through the lower portion thereof, but so arranged that the grains retained by the scraping blade 27 are forced to pass on to the surface 28' so as to slide by gravity and return to the treating passage a.

The screen 12 may be fixed or, in certain cases, it may be mounted in an oscillating manner and provided with a bracket 29 connected to an eccentric 30, as shown in Fig. 5. Said eccentric may be fixed to shaft 31 of the lower rollers 2' and 20 of the belt b and conveyor d, respectively. The movement of the screen 12, caused by eccentric 30 against the bracket 29 will be sufficient to remove any excess powder carried by the grains reaching said screen after being treated in the feeding passage a, particularly when operating in damp atmospheres.

Shaft 32 of the upper rollers 2 and 21, respectively, is provided with a pulley 33 adapted to receive a belt deriving from a motor (not shown). The same shaft 32 terminates in a crank 34 for manual operation when motive force is not available.

Summarizing, the machine operates in the following manner: The container 3 is charged with treating powder 4, and a hopper 6 is charged with grains 15 which will pass to the treating passage a through a gate 35.

Upon setting the endless belt b in motion, said powder 4 will adhere to said band and form a layer on the surface thereof, the thickness of which is controlled by scraper 17. Upon the grains rolling downwardly in a zig-zag path provided by a deflecting partition 10, they are caused to come in intimate contact with said powder. Upon reaching the screen 12, said grains will have any excess powder removed therefrom, and said excess powder will fall into container 3 and thus be recovered, while the grains will be directed towards the container 13 from which they may be discharged directly.

If the conveyor d is set in motion the treated grains will pass from container 13 over the inclined plane 24 and into the container 23, where they will be taken by the buckets 22 of said conveyor and elevated to the upper portion thereof, from which they will be discharged through the chute 25, into a sack or disposed of in any other manner.

It is evident that in carrying the invention into practice, several modifications and changes will occur to those skilled in the art, without departing from the scope of the invention as clearly set forth in the appended claims.

What I claim is:

1. In a machine for continuously dry-treating or powdering seeds and grains, a steeply inclined upstanding passageway, a correspondingly inclined endless belt with its operatively active flight uppermost and travelling upwardly lengthwise of the passageway, said belt being of a character to receive and carry on its upper surface a coating of a characteristic treating powder, means for delivering at an upper position the material to be treated to the operatively active flight of the belt, the so delivered material gravitating downwardly on the upwardly travelling flight of the belt and in collecting contact with the coating of treating material carried on the belt, a treating powder receptacle located laterally and cooperatively adjacent the lower operatively active upwardly travelling flight portion of the belt for supplying thereto the treating powder during the travel of the belt, and perforate means overlying said receptacle for deflecting the treated material from the lower portion of the belt, separating excess treating powder from the treated material and delivering the separated treating powder back to the said receptacle for reapplication to the belt.

2. In a machine for continuously dry-treating or powdering seeds and grains, a steeply inclined upstanding passageway of substantial working width and divided longitudinally into a separate elongated treating chamber proper and a parallel idling chamber, a correspondingly inclined endless belt of correspondingly ample width and with its operatively active flight uppermost and travelling upwardly lengthwise of the treating chamber and downwardly and returnably in the idling chamber, said belt being of a character to receive and carry on its upper surface a coating of a characteristic treating powder, an upper-located feeder hopper for containing and delivering the material to be treated to the operatively active flight portion of the belt, the so delivered material gravitating downwardly on the upwardly travelling flight of the belt and in collecting contact with the coating of treating powder carried on the belt, a treating powder receptacle located cooperatively adjacent the lower operatively active upwardly travelling flight portion of the belt for supplying thereto the treating powder during the travel of the belt, perforate means overlying said receptacle for deflecting the treated material from the lower portion of the belt, separating excess treating powder from the treated material and delivering the separated treating powder back to the said receptacle for re-application to the belt, a correspondingly inclined conveyor passageway at the side of and paralleling said first-mentioned upstanding passageway, the same having a discharge outlet at its upper end, means at the lower ends of said first-mentioned passageway and said conveyor passageway for transferring the deflected treated material to said conveyor passageway, a conveyor element in said conveyor passageway for elevating the received treated material and delivering the same through the discharge outlet, and common driving means for said treating powder carrier belt and for said treated material conveyor, whereby said belt and conveyor are positively operated simultaneously and in cooperative synchronism.

3. A seed and grain treating machine structure as set forth in claim 2, wherein the upper edge portion of the perforate treated material deflector and excess treating powder separator means is located cooperatively adjacent the upwardly travelling operatively active flight of the said endless treating powder carrier belt so as to define the lower terminal of the material treating chamber proper and at the same time determine the definite original thickness of treating powder coating on the operatively active flight of the belt, a scraper element disposed cooperatively between the perforate deflector and separator means and the adjacent underlying portion of the belt to prevent excess application of treating powder coating on the belt, and a lower wall portion of the feeder hopper extended and disposed in scraper relation to the upper portion of the operatively active flight of the belt.

4. A seed and grain treating machine structure as set forth in claim 2, wherein the material treating chamber proper has a cover throughout the working extent thereof and the cover is provided with a staggered series of inclined baffles and deflectors on the inner face thereof with the free edges of said baffles and deflectors spaced a slight distance from the belt so that the baffles and deflectors collectively and associatedly form tortuous passageways for the treated material in its travel through the treating chamber in contact with the coating on the powder carrier belt.

EGIDIO HIPOLITO JULIANO.